United States Patent
Jesionowski

(10) Patent No.: US 8,612,709 B2
(45) Date of Patent: Dec. 17, 2013

(54) CONTROL OF LOGICAL WRITE PROTECTION OF REWRITABLE DATA STORAGE CARTRIDGE

(75) Inventor: Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 12/770,361

(22) Filed: Apr. 29, 2010

(65) Prior Publication Data

US 2011/0267716 A1    Nov. 3, 2011

(51) Int. Cl.
*G06F 12/00* (2006.01)

(52) U.S. Cl.
USPC .............................................. 711/163; 711/4

(58) Field of Classification Search
USPC ...................................... 711/163, 4
See application file for complete search history.

(56) References Cited

U.S. PATENT DOCUMENTS

| | | | |
|---|---|---|---|
| 5,406,425 A * | 4/1995 | Johnston et al. ............ | 360/48 |
| 5,651,139 A | 7/1997 | Cripe et al. ................. | 395/490 |
| 5,754,821 A * | 5/1998 | Cripe et al. ................. | 711/164 |
| 5,802,583 A | 9/1998 | Yeager et al. ............... | 711/152 |
| 5,852,534 A | 12/1998 | Ozue et al. ................. | 360/69 |
| 6,535,344 B1 | 3/2003 | Takayama .................. | 360/60 |
| 6,674,596 B1 | 1/2004 | Takayama .................. | 360/69 |
| 2002/0172123 A1* | 11/2002 | Ohmi ....................... | 369/59.25 |
| 2003/0235000 A1 | 12/2003 | Takayama .................. | 360/69 |
| 2007/0271472 A1 | 11/2007 | Grynberg ................... | 713/193 |
| 2008/0313155 A1 | 12/2008 | Atchison et al. ............ | 707/3 |

\* cited by examiner

*Primary Examiner* — Hashem Farrokh
(74) *Attorney, Agent, or Firm* — John H. Holcombe

(57) ABSTRACT

Write protection for data of a rewritable data storage cartridge having partitions is provided in certain circumstances by providing logical write protection; and in response to detection of an application issuing at least one partition-based command with respect to the rewritable data storage cartridge, the logical write protection is disabled with respect to the detected application. Thus, where the cartridge has a non-default index addressing location, in response to detection of an application issuing at least one command initially addressing a location other than the non-default index location, logical write protection is enabled with respect to the detected application; and if the non-default index location is addressed, the logical write protection is disabled.

18 Claims, 3 Drawing Sheets

CONTROL OF LOGICAL WRITE PROTECTION OF REWRITABLE DATA STORAGE CARTRIDGE

FIELD OF THE INVENTION

This invention relates to data storage with respect to data storage systems, and, more particularly to providing logical write protection of data under certain circumstances.

BACKGROUND OF THE INVENTION

Data storage capacities of rewritable data storage cartridges, such as magnetic tape cartridges have substantially increased over time. The tracking of the stored data of rewritable data storage cartridges is typically accomplished by the use of indexes, etc., which themselves require substantial data storage. In one example, the index may comprise higher speed data storage. In another example, the index for data of a rewritable data storage cartridge is stored on a separate partition of the cartridge from the data. In some examples, the partitions may be physical partitions, for example, defined and separated by guard bands on a magnetic tape. Storing the index on the cartridge makes the cartridge "self-describing". An application may update data stored by the cartridge and should update the index describing that data.

A risk occurs if a "self-describing" cartridge is accessed by an application that is unaware that the cartridge is "self-describing". Thus, the application could write append to the data, and, without knowledge of the index, would not update the index, leaving the stored data and the index out of synchronization.

The default position for SCSI (small computer systems interface) is a location corresponding to the beginning of partition 0. One way to provide protection from the append problem would be to put the index in partition 0 and the data in partition 1. The disadvantage of such an approach is that it denies any access to the data for an application that is not partition aware. It is advantageous to put the data in partition 0 to provide read access to applications that are not partition aware, but results in the write append risk.

SUMMARY OF THE INVENTION

Methods, control and I/O (input/output) systems, and data storage drives take advantage of the fact that a partition aware application requesting access to a partitioned data storage cartridge must be able to provide specific commands to navigate to the index partition.

In one embodiment, a method for providing write protection for data of a rewritable data storage cartridge having partitions, comprises providing logical write protection of at least one partition of the rewritable data storage cartridge; and in response to detection of an application issuing at least one partition-based command with respect to the rewritable data storage cartridge, disabling the logical write protection with respect to the detected application.

In a further embodiment, wherein the rewritable data storage cartridge comprises at least one data partition and an index partition, the partition-based command comprises a command to navigate initially to the index partition.

In another embodiment, a method for providing write protection for data of a rewritable data storage cartridge, wherein the cartridge has a non-default index addressing location, comprises providing logical write protection with respect to at least a portion of the rewritable data storage cartridge; in response to detection of an application issuing at least one command initially addressing a location other than the non-default index location, write protects the cartridge with respect to the detected application; and in response to detection of an application initially addressing the non-default index location, disabling the logical write protection with respect to the detected application.

In a further embodiment, wherein the rewritable data storage cartridge is arranged in partitions, the non-default index location is at one of the partitions.

In yet another embodiment, wherein the partitions comprise at least one data partition and an index partition, the index partition having the non-default index location; additionally comprising an initial step of detecting whether the data storage cartridge is arranged in partitions, one of which is an index partition; and the step of providing logical write protection is conducted in response to such detection.

In another embodiment, wherein the at least one command which addresses the other location, addresses a default location of the data partition.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
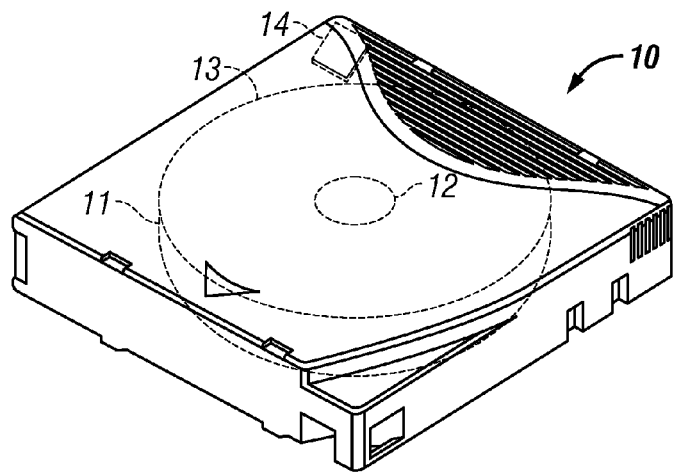
FIG. 1 is an isometric view of a removable data storage cartridge with a media, such as magnetic tape, and with a cartridge memory shown in phantom.

Referring to FIG. 1, an example of a data storage cartridge 10, such as a magnetic tape cartridge, is illustrated which comprises a rewritable magnetic tape 11 wound on a hub 12 of reel 13, and a cartridge memory 14. The cartridge memory 14, for example, comprises a transponder having a contactless interface, which is retained in the cartridge 10, for example, by being encapsulated by the cartridge when it is assembled, as is understood by those of skill in the art. The illustrated magnetic tape cartridge is a single reel cartridge. Magnetic tape cartridges may also comprise dual reel cartridges in which the tape is fed between reels of the cartridge.

Figure 2:
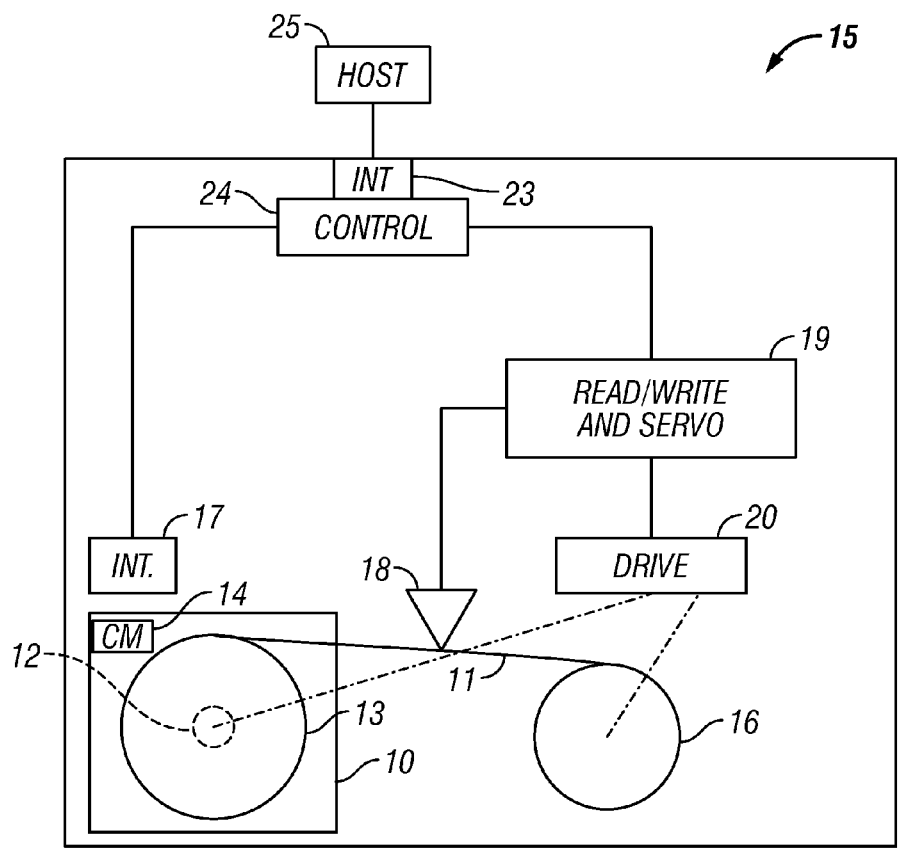
FIG. 2 is a block diagrammatic representation of a data storage drive for handling the removable data storage cartridge of FIG. 1, and which may implement the present invention.

Referring to FIG. 2, a magnetic tape drive 15 is illustrated. An example of a magnetic tape drive is the IBM® LTO (Linear Tape Open) magnetic tape drive 15, with microcode, etc., to perform desired operations with respect to the magnetic tape cartridge 10. Another example of a magnetic tape drive is the IBM® TotalStorage Enterprise magnetic tape drive. Both the above examples of magnetic tape drives employ single reel tape cartridges 10. An alternative magnetic tape drive and magnetic tape cartridge is a dual reel cartridge and drive in which both reels 13 and 16 are contained in the cartridge. In the instant example, the magnetic tape 11 is wound on a reel 13 in the cartridge 10, and, when loaded in the magnetic tape drive 15, is fed between the cartridge reel and a take up reel 16 in the magnetic tape drive. Alternatively, both reels of a dual reel cartridge are driven to feed the magnetic tape between the reels.

The magnetic tape drive comprises a memory interface 17 for reading information from, and writing information to, the cartridge memory 14 of the magnetic tape cartridge 10. A read/write system is provided for reading and writing information to the magnetic tape, and, for example, may comprise a read/write and servo head system 18 with a servo system for moving the head laterally of the magnetic tape 11, a read/write servo control 19, and a drive motor system 20 which moves the magnetic tape 11 between the cartridge reel 13 and the take up reel 16 and across the read/write and servo head system 18. The read/write and servo control 19 controls the operation of the drive motor system 20 to move the magnetic tape 11 across the read/write and servo head system 18 at a desired velocity, and, in one example, determines the location of the read/write and servo head system with respect to the magnetic tape 11. In one example, the read/write and servo head system 18 and read/write and servo control 19 employ servo signals on the magnetic tape 11 to determine the location of the read/write and servo head system, and in another example, the read/write and servo control 19 employs at least one of the reels, such as by means of a tachometer, to determine the location of the read/write and servo head system with respect to the magnetic tape 11. The read/write and servo head system 18 and read/write and servo control 19 may comprise hardware elements and may comprise any suitable form of logic, including a processor operated by software, or microcode, or firmware, or may comprise hardware logic, or a combination.

An interface of I/O (input/output) communications 23 provides communication with respect to one or more host systems or processors 25, and is configured to receive and to send information externally of the data storage drive. Alternatively, the magnetic tape drive 15 may form part of a subsystem, such as a library, and may also receive commands from the subsystem, also at I/O communications 23.

A control 24 communicates with the I/O communications 23, with memory interface 17, and communicates with the read/write system, e.g., at read/write and servo control 19. The control 24 may comprise any suitable form of logic, including one or more processors operated by software, or microcode, or firmware, or may comprise hardware logic, or a combination.

The illustrated and alternative embodiments of magnetic tape drives are known to those of skill in the art, including those which employ dual reel cartridges.

Other types of removable data storage cartridges and data storage drives are known to those of skill in the art. Examples comprise optical disk cartridges and drives, optical tape cartridges and drives, removable computer diskettes and drives, rigid magnetic disk cartridges and drives, etc.

The control 24 typically communicates with the one or more host systems 25, or subsystem via I/O communications 23, and operates the magnetic tape drive 15 in accordance with commands originating at the host, etc., and also responds to commands from the subsystem.

As illustrated, the magnetic tape drive 15 conducts read and/or write operations with respect to the magnetic tape 11 of the magnetic tape cartridge 10.

Figure 3:
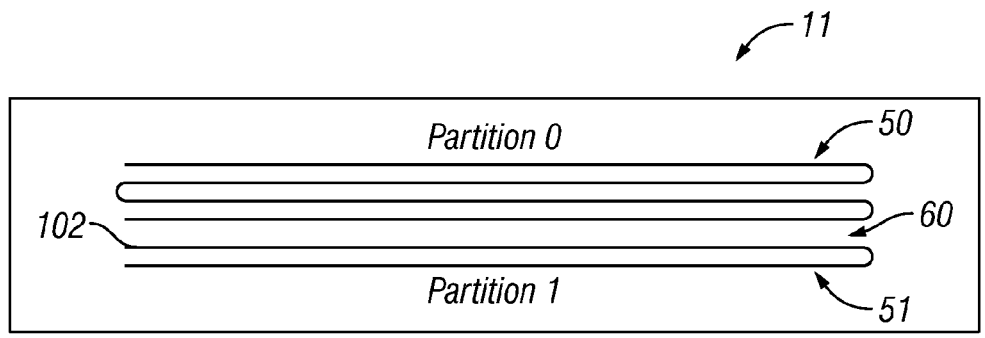
FIG. 3 is a diagrammatic representation of information provided on a magnetic tape.

Referring to FIG. 3, a magnetic tape 11 may be organized in many ways. In one example, a magnetic tape is arranged with several parallel wraps of groups of parallel tracks. In the example, the magnetic tape is moved longitudinally in a first direction while the head system reads and/or writes data with respect to one wrap, and is reversed to be moved in the opposite direction and the head system is shifted to another wrap.

A magnetic tape 11 is rewound into the cartridge 10 when usage of the cartridge is completed so that the cartridge can be removed from the tape drive 15. When a cartridge is placed into the tape drive 15, the magnetic tape is threaded, and then, under the direction of the application requesting loading of the cartridge, the tape is wound to a default location.

The information of the magnetic tape 11 may be arranged in partitions. In one example, a partition 50 comprises a plurality of wraps, and may comprise all but one or two wraps of the magnetic tape 11. Another partition 51 may comprise one or two wraps of the magnetic tape, and may be physically separated from partition 50 by a guard band 60. In one embodiment, the partitions are variable in length, occupying variable numbers of wraps. In one embodiment, partition 50 comprises a data partition, and partition 51 comprises an index partition in which information is stored describing the data of partition 50. In one embodiment, partition 50 may be subdivided into a number of data partitions.

Storing the index of partition 51 on the cartridge makes the cartridge "self-describing". An application may update data stored by the cartridge in partition 50 and should update the index of partition 51 describing that data.

A risk occurs if a "self-describing" cartridge is accessed by an application that is unaware that the cartridge is "self-describing". Thus, the application could write append to the data within partition 50, and without knowledge of the index of partition 51, would not update the index, leaving the stored data and the index out of synchronization.

The default position for SCSI (small computer systems interface) is the beginning of partition 0. One way to provide protection from the append problem would be to put the index in partition 0 and the data in partition 1. The disadvantage of such an approach is that it denies any access to the data for an application that is not partition aware. It is advantageous to put the data in partition 0 to provide read access to applications that are not partition aware, but results in the write append risk.

An application running at system 25 of FIG. 2 may instigate loading of the data storage cartridge 10 into the data storage drive 15, for example, by submitting to a data storage library in which the data storage drive is mounted, a command to insert the cartridge in the data storage drive. The drive then loads the inserted cartridge.

Figure 5:
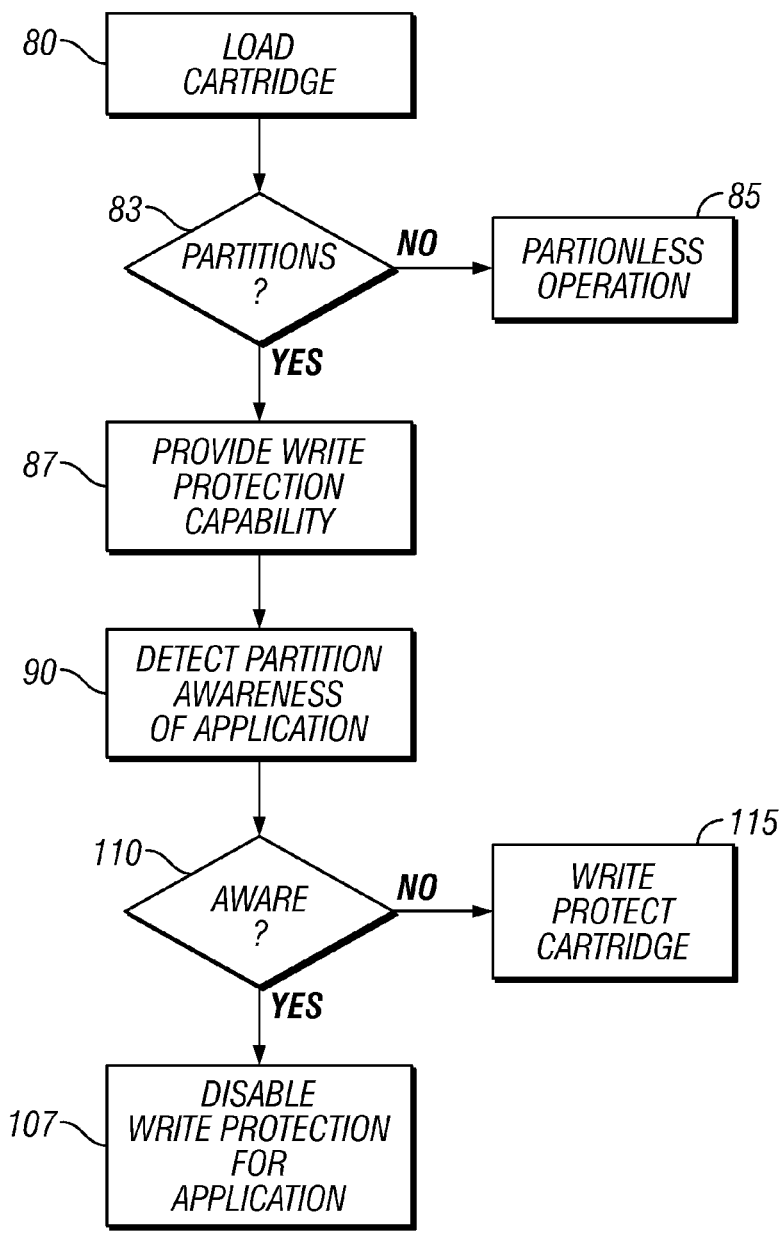
FIG. 5 is a flow chart depicting an exemplary method of operating the data storage drive of FIG. 2.

Referring to FIGS. 2, 3 and 5, as the cartridge 10 is loaded into the data storage drive in step 80, the data storage drive control 24 communicates with the cartridge memory 14 via interface 17 to read information regarding the cartridge. If the data storage cartridge 10 is arranged to have partitions, that information will be stored by the cartridge memory, and will be read by the control 24. In step 83, the control determines whether the loaded data storage cartridge 10 is arranged to have partitions. If the cartridge 10 is partitionless, the control 24 operates the data storage drive in a partitionless, or legacy, mode 85.

A control 24 conducts an initialization sequence with respect to the cartridge, and communicates with the requesting application via I/O communications 23.

The present invention guards against a requesting application that is not aware of the partitioning of the cartridge and that may access the default location in a data partition 50, and then move to desired data in the data partition and append additional data to the existing data, as though the cartridge were a partitionless cartridge. Without the application updating the index of partition 51, the data of partition 50 would be out of synchronization with the index of partition 51.

The control 24, in accordance with the present invention, provides logical write protection to at least a portion of the cartridge in step 87, and in step 83, detects, for example, from the cartridge memory 14, whether the data storage cartridge is arranged in partitions, and, in one embodiment, whether one of the partitions is an index partition. If the cartridge is arranged in partitions, in step 90, the control 24 is ready to logically write protect the cartridge. This logical write protection may be disabled by drive detection of a partition navigation command, such as to a non-default index location, meaning that the requesting application is partition aware. A non-default index location may, for example, be the beginning 102 of the index partition 51.

Figure 4:
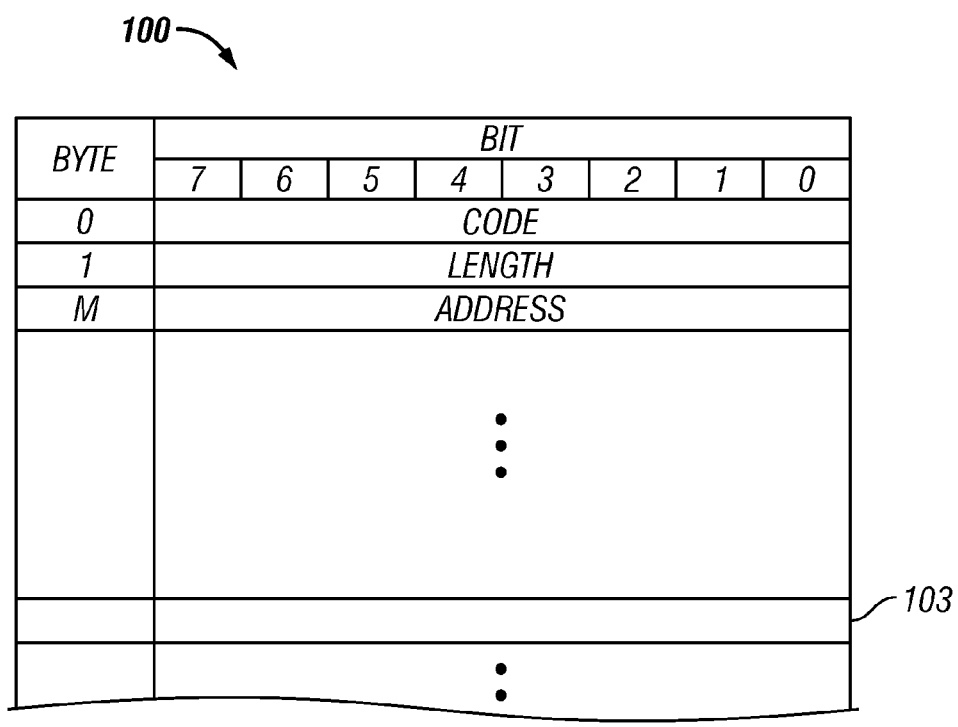
FIG. 4 is a diagrammatic representation of a command provided to the data storage drive of FIG. 2.

Referring additionally to FIG. 4, specific commands are required to navigate to a non-zero partition. In one example, a partition aware requesting application will navigate to the non-default index location, and then will read the index from the index partition before it attempts to read/write the data partition, whereas a non-partition aware application will navigate to the default location, for example, at a location at the beginning of partition 50. FIG. 4 provides an example of a command 100 issued by the requesting application via I/O communications 23.

In step 90, the control 24 detects the nature of the command 100 issued at initialization by the requesting application. In one embodiment, in step 102, the control 24 determines from step 90 whether the command or commands 100 of the requesting application is navigating initially to a default location, indicating that the requesting application is non-partition aware, or whether the command(s) is initially addressing the index partition, such as the non-default index location, indicating that the requesting application is partition aware. If step 102 indicates that the requesting application is initially addressing a non-partition location, such as a location other than the non-default index location, the control, in step 105, write protects the cartridge with respect to the detected application.

If, instead, step 110 indicates that the requesting application is issuing at least one command initially addressing the index partition, such as the non-default index location, indicating that the requesting application is partition aware, the control 24, in step 115, disables the logical write protection with respect to the detected application.

Thus, in step 110, the control 24 determines from step 90 whether the command or commands 100 of the requesting application is navigating to the index partition 51, indicating that the requesting application is partition aware, or whether the command(s) is initially addressing a data partition 50, indicating that the requesting application is not partition aware. If step 102 indicates that the requesting application is initially addressing a data partition, the control, in step 115, enables the write protection for the cartridge, with respect to the detected application.

If, instead, step 102 indicates that the requesting application is issuing at least one command initially addressing the index partition, indicating that the requesting application is partition aware, the control 24, in step 107, disables the logical write protection with respect to the detected application.

Thus, if the detected application issues a command that indicates that it is partition aware, such as a command to navigate initially to a non-default index location of an index partition 51, indicated by step 110, then control 24 disables the write protection protecting data of at least a portion of the cartridge.

Referring to FIGS. 2 and 3, navigation to a particular location or to a particular partition with respect to magnetic tape 11 may comprise lateral movement of the tape head 18 from one wrap to another. Alternatively, in other media, navigation to a particular location or to a particular partition may comprise movement of the media or head between tracks.

The present invention may be implemented by the control 24 of the data storage drive 15 as an optional mode of the data storage drive, for example as set by an administrator through a secure interface, or may be implemented as a fixed behavior of specific data storage drives. The present invention may be implemented as an optional mode of the data storage cartridge that is specified when formatting the partitioned media, for example by a utility, a host application or a data storage library, and is provided at or to the data storage drive, and selected when the cartridge is loaded. The present invention may be implemented as a requirement of support for the implementation of partitions, for example in the standards specification for partitioning. The present invention may be implemented as a vendor-specific implementation for specific data storage cartridges and corresponding data storage drives.

The implementations may involve software, firmware, micro-code, hardware and/or any combination thereof. The implementation may take the form of code or logic implemented in a medium, such as memory, storage and/or circuitry of control 24 where the medium may comprise hardware logic (e.g. an integrated circuit chip, Programmable Gate Array [PGA], Application Specific Integrated Circuit [ASIC], or other circuit, logic or device), or a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk, compact disk—read only memory [CD-ROM], compact disk—read/write [CD-R/W] and DVD).

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for providing write protection for data of a rewritable data storage cartridge having partitions, comprising:
   providing logical write protection of at least one said partition of said rewritable data storage cartridge; and
   in response to detection of an application issuing at least one partition-based command with respect to said rewritable data storage cartridge, disabling said logical write protection with respect to said detected application.

2. The method of claim 1, wherein said rewritable data storage cartridge comprises at least one data partition and an index partition, and wherein said partition-based command comprises a command to navigate initially to said index partition.

3. A method for providing write protection for data of a rewritable data storage cartridge, said cartridge having a non-default index addressing location, comprising:
providing logical write protection with respect to at least a portion of said rewritable data storage cartridge;
in response to detection of an application issuing at least one command initially addressing a location other than said non-default index location, enabling said logical write protection with respect to said detected application; and
in response to detection of said application initially addressing said non-default index location, disabling said logical write protection with respect to said detected application.

4. The method of claim 3, wherein said rewritable data storage cartridge is arranged in partitions, and wherein said non-default index location is at one of said partitions.

5. The method of claim 4, wherein said partitions comprise at least one data partition and an index partition, said index partition having said non-default index location; additionally comprising an initial step of detecting whether said data storage cartridge is arranged in partitions, one of which is an index partition; and said step of providing logical write protection is conducted in response to such detection.

6. The method of claim 5, wherein said at least one command addressing said other location, addresses a default location of said data partition.

7. A control and I/O (input/output) system for a magnetic tape drive, said magnetic tape drive additionally comprising tape read/write and drive system configured to read and write data with respect to a rewritable data storage cartridge having partitions, said control and I/O system comprising:
I/O communications; and
control system configured to:
provide logical write protection of at least one said partition of said rewritable data storage cartridge; and
in response to receiving at said I/O communications at least one command of an application comprising a partition-based command with respect to said rewritable data storage cartridge, disabling said logical write protection with respect to said detected application.

8. The control and I/O system of claim 7, wherein said rewritable data storage cartridge comprises at least one data partition and an index partition, and wherein said partition-based command comprises a command to navigate initially to said index partition.

9. A control and I/O (input/output) system for a data storage drive, said data storage drive additionally comprising read/write and drive system configured to read and write data with respect to a rewritable data storage cartridge having a non-default index addressing location, said control and I/O system comprising:
I/O communications; and
control system configured to:
provide logical write protection with respect to at least a portion of said rewritable data storage cartridge;
in response to receiving at said I/O communications at least one command of an application initially addressing a location other than said non-default index location, enabling said logical write protection with respect to said detected application; and
in response to receiving at said I/O communications at least one command of said application initially addressing said non-default index location, disabling said logical write protection with respect to said detected application.

10. The control and I/O system of claim 9, wherein said rewritable data storage cartridge is arranged in partitions, and wherein said non-default index location is at one of said partitions.

11. The control and I/O system of claim 10, wherein said partitions comprise at least one data partition and an index partition, said index partition having said non-default index location; and wherein said at least one command addressing said other location, addresses a location of said data partition; and wherein said control system is additionally configured to initially detect whether said data storage cartridge is arranged in partitions, one of which is an index partition; and to provide such logical write protection in response to said detection.

12. The control and I/O system of claim 11, wherein said at least one command addressing said other location, addresses a default location of said data partition.

13. A data storage drive, comprising:
I/O (input/output) communications;
a read/write and drive system configured to read and write data with respect to a rewritable data storage cartridge having partitions; and
a control system configured to:
provide logical write protection of at least one said partition of said rewritable data storage cartridge; and
in response to receiving at said I/O communications at least one command of an application comprising a partition-based command with respect to said rewritable data storage cartridge, disabling said logical write protection with respect to said detected application.

14. The data storage drive of claim 13, wherein said rewritable data storage cartridge comprises at least one data partition and an index partition, and wherein said partition-based command comprises a command to navigate initially to said index partition.

15. A data storage drive, comprising:
I/O communications;
a read/write and drive system configured to read and write data with respect to a rewritable data storage cartridge having a non-default index addressing location; and
a control system configured to:
provide logical write protection with respect to at least a portion of said rewritable data storage cartridge;
in response to receiving at said I/O communications at least one command of an application initially addressing a location other than said non-default index location, enabling said logical write protection with respect to said detected application; and
in response to receiving at said I/O communications at least one command of said application initially addressing said non-default index location, disabling said logical write protection with respect to said detected application.

16. The data storage drive of claim 15, wherein said rewritable data storage cartridge is arranged in partitions, and wherein said non-default index location is at one of said partitions.

17. The data storage drive of claim 16, wherein said partitions comprise at least one data partition and an index partition, said index partition having said non-default index location; and wherein said control system is additionally configured to initially detect whether said data storage cartridge is arranged in partitions, one of which is an index partition; and to provide said logical write protection in response to such detection.

18. The data storage drive of claim 17, wherein said at least one command addressing said other location, addresses a default location of said data partition.

* * * * *